United States Patent [19]

Messinger et al.

[11] Patent Number: 4,649,762
[45] Date of Patent: Mar. 17, 1987

[54] ROCKER ARM DRIVE FOR ELECTRICAL APPLIANCES

[75] Inventors: Werner Messinger, Kronberg; Karl Trölltsch, Frankfurt am Main, both of Fed. Rep. of Germany

[73] Assignee: Braun Aktiengesellschaft, Kronberg, Fed. Rep. of Germany

[21] Appl. No.: 680,697

[22] Filed: Dec. 12, 1984

[30] Foreign Application Priority Data

Dec. 23, 1983 [DE] Fed. Rep. of Germany ....... 3346656

[51] Int. Cl.⁴ .................. B26B 19/04; G05G 3/00
[52] U.S. Cl. ..................................... 74/42; 74/581
[58] Field of Search .............. 30/218, 219; 74/40, 74/519, 581, 42

[56] References Cited

U.S. PATENT DOCUMENTS 4,367,658  1/1983  Rochelt ........................ 74/40

FOREIGN PATENT DOCUMENTS

| | | |
|---|---|---|
| 2117319 | 10/1972 | Fed. Rep. of Germany ........ 74/581 |
| 2616391 | 12/1976 | Fed. Rep. of Germany ........ 74/519 |
| 2631751 | 2/1977  | Fed. Rep. of Germany ........ 74/581 |
| 2603207 | 8/1977  | Fed. Rep. of Germany ........ 74/519 |
| 2749936 | 11/1977 | Fed. Rep. of Germany . |
| 2910469 | 3/1979  | Fed. Rep. of Germany . |
| 2409592 | 3/1980  | Fed. Rep. of Germany . |
| 3213099 | 4/1982  | Fed. Rep. of Germany . |
| 624331  | 6/1949  | United Kingdom ................... 74/519 |
| 47902   | 2/1979  | U.S.S.R. ................................ 30/219 |

*Primary Examiner*—Lawrence Staab
*Attorney, Agent, or Firm*—Raymond J. De Vellis

[57] ABSTRACT

Device for converting the rotary motion of an eccentric driven by a motor shaft into an oscillating motion of a working tool in electrically powered appliances, consisting of a double-armed rocker arm and an oscillating body, connecting the rocker arm with the eccentric, composed of three connecting arms, two of which are assembled into a frame-like structure by appropriate design, whereby the eccentric engages one meeting point and the third connecting arm engages the other meeting point, said third arm being rigidly connected with one lever arm of the double-armed rocker arm. The connecting arms are each provided with a film hinge, of which two hinges lie on a common middle/bending axis which intersects the lengthwise axis of the double-armed rocker arm.

6 Claims, 3 Drawing Figures

ROCKER ARM DRIVE FOR ELECTRICAL APPLIANCES

BACKGROUND OF THE INVENTION

The invention relates to a device for converting the rotary motion of an eccentric driven by a motor shaft into a reciprocating motion of a working tool coupled with a shaft pin in electrically driven appliances, in whose housing a double-armed rocker arm provided with a shaft pin is pivotably mounted and an oscillating body is provided.

German AS No. 27 49 936 teaches an oscillating element for driving a cutter block of an electric dry shaver, comprising a drive plate for coupling to the cutter block, said plate comprising studs firmly attached to the housing and flexible in the direction of motion of the cutter block, and provided with a coupling arm flexible transversely to the direction of motion of the cutter block for coupling to the eccentric. This oscillating element is not only very costly to manufacture, but also suffers from the disadvantage that the oscillating motion of the drive plate produces a height loss which pulls the cutter block coupled to the drive arm, away from the cutting foil stretched around it.

Japanese Utility Model No. 57-57650 teaches a dry shaver with a rotary motor, an oscillating lower cutter, and a crank and rocker linkage to convert the rotary motion of the motor into an oscillating motion of the lower cutter. The motor shaft is aligned parallel to the lengthwise axis of the rocker arm engaging the lower cutter, and is disposed displaced laterally by the length of the crank rod. The crank rod is made fork-shaped in the vicinity of the rocker arm, whereby the rocker arm engages this fork and is held in a pivotable position in the fork by means of an articulation pin. The crank rod is also connected by an eccentric drive provided in the head of the connecting rod with the motor shaft of the rotary motor. An important disadvantage of this type of transmission is that the swing of the rocker arm is compensated by the rigid crank rod only with the accompaniment of considerable losses to pressure and friction in both bearing points, the articulation pin and eccentric drive, and the crank rod, whereby a large fraction of the power to be transmitted is lost and must necessarily be made up by applying additional energy. Increased energy consumption makes itself felt perceptibly disadvantageously to the user of such a device by virtue of the fact that after brief use, e.g. after a small number of shaves, the battery must be recharged or replaced.

SUMMARY OF THE INVENTION

German OS 29 10 469 teaches a swing frame with a linearly oscillating swing beam, connected with a lower cutter by two drive pins and fastened to the housing by two pairs of flexible strips. The connecting rod which sets the swing beam oscillating is part of an additional swing frame formed on the swing beam and partially composed of flexible strips. The pressure exerted by a user when shaving is transmitted directly to the swing beam in the lower cutter linked to the swing beam and thence to the oscillating system, correspondingly exerting a disadvantageous influence on its oscillating behavior.

The goal of the present invention is to develop a device of the species recited hereinabove wherein conversion of the rotary motion into a reciprocating motion is accomplished with the minimum possible losses in driving energy. The device is intended to ensure unimpeded motion in all required degrees of freedom with little friction, and to operate with low noise. In addition the device must be so designed that the central axis of the motor shaft of the rotary motor can lie both displaced parallel to the common lengthwise axis passing through the two lever arms of the double-armed rocker arm and transversely to a lengthwise axis of one of the two lever arms of the double-armed rocker arm.

According to the invention, this goal is achieved by virtue of the fact that the oscillating body which links the eccentric with the double-armed rocker arm consists of three mutually parallel connecting arms, the fact that two connecting arms are assembled at their respective ends indirectly by cross studs and/or directly by appropriate design to form a frame-like structure, the fact that at one meeting point of the two connecting arms the oscillating body is coupled to the eccentric and at the opposite meeting point the third connecting arm is formed to extend between the two connecting arms, the free end of said third arm is rigidly connected with the corresponding lever arm of the double-armed rocker arm and the opposite end is provided with a film hinge, and by the fact that the two connecting arms are each provided with a film hinge, whose common middle/bending axis intersects the lengthwise axis of the corresponding lever arm of the double-armed rocker arm.

The solution according to the invention is characterized by a small loss of power in motion conversion and a good oscillating behavior, due to the fact that the bending axis which passes through the film hinges of the two assembled connecting arms and compensates for the height component of the radial oscillating motion of the double-armed rocker arm, crosses the lengthwise axis of the corresponding lever arm of the double-armed rocker arm, forming an articulation point therewith, and by the fact that the lengthwise axis of the connecting arm rigidly mounted to the double-armed rocker arm terminates at this articulation point.

In another embodiment of the invention, provision is made for the connecting axis of the two meeting points of the connecting arms of the oscillating body to intersect the lengthwise axis of the corresponding lever arm of the double-armed rocker arm.

A suitable balancing of masses of the oscillating body is achieved according to the invention by the fact that the connecting axis passing through the two meeting points of the connecting arms divides the oscillating body into two congruent halves.

A further advantage of the device according to the invention consists in the fact that the latter allows designs which apply in particular to the adaptation of this device to preset installation criteria in devices of the stated species, without additional construction cost. For this purpose, the lengthwise axis of the lever arm of the double-armed rocker arm associated with the connecting arm can extend both in the direction of the lengthwise axis of the lever arm, provided with a shaft pin, or can run at an angle to this lengthwise axis while preserving its double-armedness.

In this design it must be ensured that the connecting axis of the meeting points of the two connecting arms intersects the lengthwise axis of the corresponding lever arm of the double-armed rocker arm at right angles. In addition, the motion conversion indicated according to the invention is not limited to a certain lever ratio of the two lever arms of the double-armed lever. This ratio can be varied accordingly for each application.

BRIEF DESCRIPTION OF THE DRAWINGS

The invention is described hereinbelow with reference to the drawings, in which preferred embodiments of devices for converting motion are shown, for example for installation in a dry shaver.

DETAILED DESCRIPTION

Figure 1:
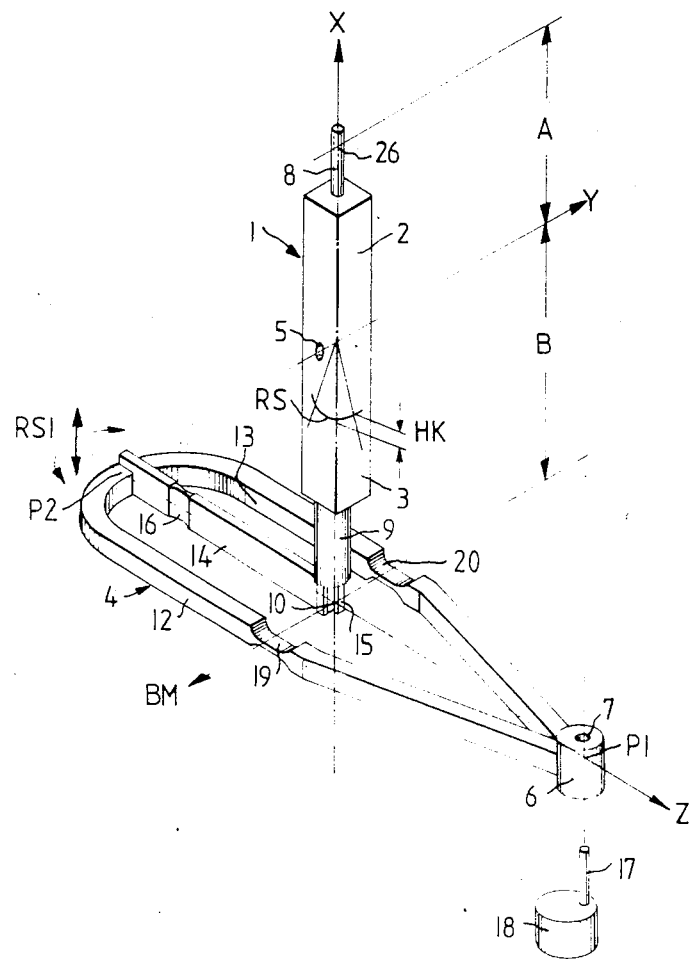
FIG. 1 is a perspective view of a double-armed rocker arm and an oscillating body.

FIG. 1 shows the double-armed rocker arm at 1, the lever arm with a shaft pin 8 for the working tool to be driven, e.g. the cutter block of a dry shaver, at 2 and the lever arm associated with oscillating body 4 at 3. Double-armed rocker arm 1 has a bearing bore 5 whose pivot axis is indicated by y. A shaft pin, not shown but located on a housing part of the appliance, engages bearing bore 5. The pivot point of the lengthwise axis x passing through lever arms 2 and 3, shaft pins 8 and bearing pin 9 on lever arm 3 lies on pivot axis y.

Oscillating body 4 consists of three connecting arms 12, 13, and 14. Connecting arms 12 and 13 are connected at their corresponding ends indirectly by cross studs (FIG. 2) or directly by appropriate design to form a frame-shaped structure at meeting points P1 and P2. The connecting axis of the two meeting points P1 and P2 is designated z.

Connecting arm 14 is formed at meeting point P2 on the assembled connecting arms 12 and 13 and extends between arms 12 and 13 up to bearing pin 9 of double-armed rocker arm 1, to which it is rigidly connected by connecting head 15. A film hinge 16 extending parallel to the lengthwise axis is provided on the end of connecting arm 14 away from mounting head 6.

At meeting point P1 of the two connecting arms 12 and 13, a connecting rod head 6 is provided, in whose bore 7 the eccentric pin 17 of eccentric 18 engages for driving purposes. Each of the two arms 12 and 13 has a film hinge 19 and 20, whose common bending axis BM runs between the two meeting points P1 and P2 transversely to connecting axis z, i.e. it intersects connecting axis z. The point of intersection, designated articulation point 10, is preferably located midway between the meeting points P1 and P2. The lengthwise axis x of double-armed rocker arm 1 (FIG. 1) and lengthwise axis x1 (FIG. 3) of lever arm 3 of the double-armed rocker arm, associated with oscillating body 4, is provided so that it passes through the articulation point 10 of connecting axis z and bending axis BM in all embodiments of the invention. The distance from this articulation point 10 to meeting point P2 determines the length of connecting arm 14.

For the purpose of a suitable balancing of masses of oscillating body 4, the connecting axis z divides the oscillating body 4 into two congruent halves. The lengthwise axis of connecting arm 14, at the bottom dead center of the radial pivoting motion RS of lever arm 3 about pivot axis y, coincides with connecting axis z. The height component HK which results from the radial pivoting motion RS of lever arm 3 to the corresponding top dead center points acts through connecting arm 14 on meeting point P2 of connecting arms 12 and 13 and causes an analogous pivoting motion RS1 of connecting arm parts 13 and 14 leading from meeting point P2 to bending axis BM around bending axis BM, while the connecting arm parts 13 and 14 leading from bending axis BM to connecting rod head 6 retain their rigid position.

The circular motion of eccentric pin 17 around the eccentric bearing of eccentric 18 on the shaft of the rotary motor is divided into a linear and a lateral component. The lateral component causes a pivoting motion of connecting arms 12 and 13 around the bending axis of film hinge 16, while the linear component is transmitted via connecting arms 12 and 13 and connecting arm 14 formed at meeting point P2 on the lever arm 3 of double-armed rocker arm 1.

In the oscillating body 4 in FIG. 1, connecting arms 12 and 13 run partially parallel to connecting axis z, whereby the ends facing meeting point P2 are brought in rounded form to meeting point P2, while the ends facing meeting point P1 are brought in bent form to meeting point P1 a short distance beyond film hinges 19 and 20. This design for oscillating body 4 is especially advantageous, since the requirements imposed on the swing bridge in addition to the motion conversion, such as stability, low material requirement, and the resultant low oscillating mass are optimally met.

Figure 2:
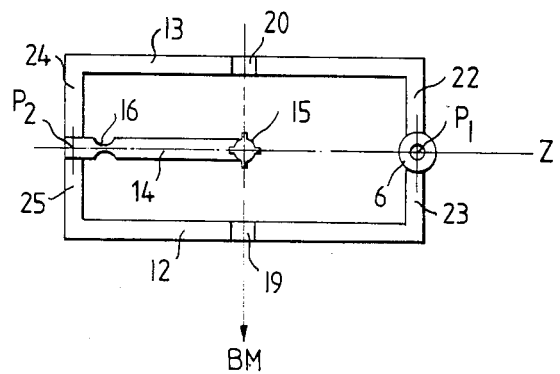
FIG. 2 is a top view of an oscillating body.

FIG. 2 shows a modified embodiment of swing bridge 4, which differs from the swing bridge in FIG. 1 only in that the connecting arms 12 and 13 are guided indirectly by cross studs 22, 23, 24, and 25 to meeting points P1 and P2. It is also evident from this figure that meeting point P1 is located both on connecting axis z and on the central axis of bore 7 in connecting rod head 6. The bending axis BM of film hinges 19 and 20 intersects connecting axis z. Articulation point 10 lies at the intersection. A mounting head 15 provided with reinforcing ribs is formed on connecting arm 14, for engagement in an appropriately designed opening in bearing pin 9 and production of a rigid connection. Film hinge 16 in connecting arm 14 forms the articulation for lateral pivoting motion of connecting arms 12 and 13.

By virtue of its design and the arrangement of the articulation points, oscillating body 4 allows a plurality of variations in the design of double-armed rocker arm 1. An embodiment that differs from the basic version shown in FIG. 1 is shown in FIG. 3.

The basic version shown in FIG. 1 consists of double-armed rocker arm 1 with the two lever arms 2 and 3, shaft pin 8, bearing pin 9, oscillating body 4, eccentric pin 15 and eccentric 16, driven by a rotary motor, not shown. The length of lever arm 2, marked A, extends from the center of bearing bore 5 to coupling point 26 of a working tool engaging the shaft pin and not shown, and the length of lever arm 3, marked B, runs from the center of bearing bore 5 to articulation point 10. Coupling point 26, the center of bearing bore 5, and articulation point 10 lie on the lengthwise axis x of the double-armed rocker arm. The lever ratio A:B of lever arms 2 and 3 can be A=B or different, i.e, A is greater than B or A is less than B, depending on the specific application.

Figure 3:
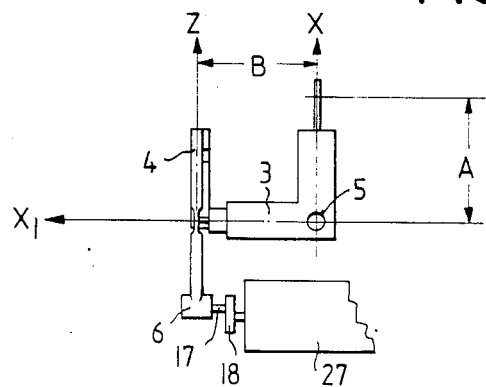
FIG. 3 is a schematic diagram of a design variation of a double-armed rocker arm with an oscillating body and rotary motor.

As shown in FIG. 3, it is possible to bend the lever arm 3 of double-armed rocker arm 1 associated with oscillating body 4 at an angle. In these cases it is merely necessary to ensure that the lengthwise axis of bent lever arm 3, indicated in FIG. 3 by $x_1$, intersects lengthwise axis x either at the midpoint of bearing bore 5 or in lever arm 3, and that connecting axis z of oscillating body 4 intersects the lengthwise axis $x_1$ of bent lever arm 3 at right angles. Rotary motor 27 is mounted parallel to lengthwise axis $x_1$ and its shaft is coupled to eccentric 18. Eccentric 18 is engaged via eccentric pin 17 with connecting rod head 6 of oscillating body 4.

While embodiments and applications of the invention have been shown and described, it will be apparent to those skilled in the art that many more modifications are possible without departing from the inventive concepts herein described.

What is claimed as new and desired to be secured by Letters Patent of the United States is:

1. A device for converting rotary motion of an eccentric driven by a shaft into reciprocating motion of a working tool in a powered appliance having a housing including a shaft pin means, comprising:
    a double-armed rocker arm (1), including an upper lever arm portion (2), having a free end, and a lower lever arm portion (3), having a free end, and a bearing means (5), having a pivot axis, located between said upper lever arm portion (2) and said lower lever arm portion (3) for engagement with the shaft pin means of the appliance;
    a shaft pin (8), extending from the free end of said upper lever arm portion (2) for driving the working tool;
    a frame-like oscillating body (4) having first (12), second (13) and third (14) substantially parallel connecting arms, each having a first and second end, and first (22), second (23), third (24) and fourth (25) cross studs, each having a first and second end, said first end of said first cross stud (22) being connected to said second end of said second connecting arm (13), said second end of said first cross stud (22) being connected to said first end of said second cross stud (23) at a first meeting place (P1) for coupling to the eccentric, said second end of said second cross stud (23) being connected to said first end of said first connecting arm (12), said second end of said first connecting arm (12) being connected to said first end of said fourth cross stud (25), said second end of said fourth cross stud (25) being connected to said first end of said third connecting arm (14) and to said first end of said third cross stud (24) at a second meeting point (P2), said second end of said third connecting arm (14) being rigidly connected to said free end of said lower lever arm portion (3), said second end of said third cross stud (24) being connected to said first end of said second connecting arm (13), said second end of said second connecting arm (13) being connected to said first end of said first cross stud (22);
    first film hinge means (16) formed between said first and second end of said third connecting arm (14) proximate said second meeting point (P2); and
    second film hinge means (19) formed between said first and second ends of said first connecting arm (12); and
    third film hinge means (20) formed between said first and second ends of said second connecting arm (13), wherein the approximate middle of said second and third film hinge means form a common bending axis (BM) which intersects the lengthwise axis of said lower lever arm portion (3).

2. The device as in claim 1 wherein said first meeting point (P1) and said second meeting point (P2) form a common connecting axis (Z) which intersects the lengthwise axis of said lower lever arm portion (3).

3. The device as in claim 2 wherein the common connecting axis (Z) divides said oscillating body (4) into two congruent halves.

4. A device for converting rotary motion of an eccentric driven by a shaft into reciprocating motion of a working tool in a powered appliance having a housing including a shaft pin means, comprising:
    a double-armed rocker arm (1), including an upper lever arm portion (2), having a free end, and a lower lever arm portion (3), having a free end, and a bearing means (5), having a pivot axis, located between said upper lever arm portion (2) and said lower lever arm portion (3) for engagement with the shaft pin means of the appliance;
    a shaft pin (8), extending from the free end of said upper lever arm portion (2) for driving the working tool;
    a frame-like oscillating body (4) having first (12), second (13) and third (14) substantially parallel connecting arms, each having a first and second end, said first end of said first connecting arm (12) being connected to said first end of said second connecting arm (13), at a first meeting place (P1) for coupling to the eccentric, said second end of said first connecting arm (12) being connected to said second end of said second connecting arm (13), and to said second end of said third connecting arm (14) at a second meeting point (P2), said first end of said third connecting arm (14) being rigidly connected to said free end of said lower lever arm portion (3);
    first film hinge means (16) formed between said first and second end of said third connecting arm (14) proximate said second meeting point (P2); and
    second film hinge means (19) formed between said first and second ends of said first connecting arm (12); and
    third film hinge means (20) formed between said first and second ends of said second connecting arm (13), wherein the approximate middle of said second and third film hinge means form a common bending axis (BM) which intersects the lengthwise axis of said lower lever arm portion (3).

5. The device as in claim 4 wherein said first meeting point (P1) and said second meeting point (P2) form a common connecting axis (Z) which intersects the lengthwise axis of said lower lever arm portion (3).

6. The device as in claim 5 wherein the common connecting axis (Z) divides said oscillating body (4) into two congruent halves.

* * * * *